United States Patent
Sharan et al.

(10) Patent No.: US 8,850,472 B2
(45) Date of Patent: Sep. 30, 2014

(54) METHOD AND APPARATUS FOR CUSTOMIZING USER EXPERIENCE

(75) Inventors: Santosh Sharan, Acton, MA (US); Amnon Gavish, Newton, MA (US); Greg Sigel, Kentfield, CA (US); Gordon Kessler, Mount Kisco, NY (US)

(73) Assignee: Nuance Communications, Inc., Burlington, MA (US)

( * ) Notice: Subject to any disclaimer, the term of this patent is extended or adjusted under 35 U.S.C. 154(b) by 860 days.

(21) Appl. No.: 12/565,916

(22) Filed: Sep. 24, 2009

(65) Prior Publication Data

US 2010/0257552 A1 Oct. 7, 2010

Related U.S. Application Data

(60) Provisional application No. 61/165,769, filed on Apr. 1, 2009.

(51) Int. Cl.
| | |
|---|---|
| *H04N 7/10* | (2006.01) |
| *H04N 7/025* | (2006.01) |
| *G06Q 30/02* | (2012.01) |
| *H04N 21/81* | (2011.01) |
| *H04N 21/4788* | (2011.01) |
| *H04N 7/173* | (2011.01) |
| *H04N 21/258* | (2011.01) |

(52) U.S. Cl.
CPC ....... *H04N 21/4788* (2013.01); *G06Q 30/0261* (2013.01); *H04N 21/812* (2013.01); *G06Q 30/02* (2013.01); *H04N 7/17318* (2013.01); *G06Q 30/0251* (2013.01); *H04N 21/25841* (2013.01)
USPC .............................................. 725/34; 725/19

(58) Field of Classification Search
CPC .......................... H04N 21/4788; H04N 21/812
USPC ............... 725/13, 19, 32–61; 348/14.05, 734; 345/173; 382/181; 705/14.49, 14.54, 705/14.55
See application file for complete search history.

(56) References Cited

U.S. PATENT DOCUMENTS

| | | |
|---|---|---|
| 5,612,690 A | 3/1997 | Levy et al. |
| 5,748,512 A | 5/1998 | Vargas |
| 5,818,437 A | 10/1998 | Grover et al. |
| 5,963,671 A | 10/1999 | Comerford et al. |
| 6,011,554 A | 1/2000 | King et al. |
| 6,104,384 A | 8/2000 | Moon et al. |
| 6,307,548 B1 | 10/2001 | Flinchem et al. |
| 6,307,549 B1 | 10/2001 | King et al. |
| 6,698,020 B1 | 2/2004 | Zigmond et al. |
| 6,801,190 B1 | 10/2004 | Robinson et al. |
| 7,088,345 B2 | 8/2006 | Robinson et al. |
| 7,098,896 B2 | 8/2006 | Kushler et al. |
| 7,162,694 B2 | 1/2007 | Venolia |
| 7,175,438 B2 | 2/2007 | Levy |

(Continued)

OTHER PUBLICATIONS

Tengo Product Information, available at , copyright 2006.

*Primary Examiner* — John Schnurr
*Assistant Examiner* — Patrick A Ryan
(74) *Attorney, Agent, or Firm* — Perkins Coie LLP

(57) ABSTRACT

A method for customizing a user communication experience is provided. The method includes the steps of receiving a user communication input and determining one or more communication input characteristics. Thereafter, one or more advertisements are provided to the user in accordance with the user communication input and the one or more determined communication characteristics.

27 Claims, 3 Drawing Sheets

(56) References Cited

U.S. PATENT DOCUMENTS

| | | | |
|---|---|---|---|
| 7,202,853 B2 | 4/2007 | Ng et al. | |
| 7,207,011 B2 | 4/2007 | Mulvey et al. | |
| 7,250,938 B2 | 7/2007 | Kirkland et al. | |
| 7,277,088 B2 | 10/2007 | Robinson et al. | |
| 7,293,231 B1 | 11/2007 | Gunn et al. | |
| 7,324,083 B2 | 1/2008 | Fux et al. | |
| 7,430,508 B2 | 9/2008 | Williamson et al. | |
| 7,440,889 B1 | 10/2008 | Skiena et al. | |
| 7,440,896 B2 | 10/2008 | Williamson et al. | |
| 7,444,658 B1 * | 10/2008 | Matz et al. | 725/34 |
| 7,457,466 B2 | 11/2008 | Williamson et al. | |
| 7,475,004 B2 | 1/2009 | Fux et al. | |
| 7,477,238 B2 | 1/2009 | Fux et al. | |
| 8,307,389 B2 * | 11/2012 | Sakai et al. | 725/25 |
| 2003/0110499 A1 * | 6/2003 | Knudson et al. | 725/42 |
| 2005/0262542 A1 * | 11/2005 | DeWeese et al. | 725/106 |
| 2006/0136298 A1 * | 6/2006 | Klein et al. | 705/14 |
| 2006/0247915 A1 | 11/2006 | Bradford et al. | |
| 2007/0061753 A1 | 3/2007 | Ng et al. | |
| 2008/0104026 A1 * | 5/2008 | Koran | 707/3 |
| 2008/0122796 A1 | 5/2008 | Jobs et al. | |
| 2008/0126481 A1 * | 5/2008 | Chakra et al. | 709/204 |
| 2008/0184326 A1 * | 7/2008 | Nakajima | 725/133 |
| 2009/0076917 A1 * | 3/2009 | Jablokov et al. | 705/14 |

* cited by examiner

METHOD AND APPARATUS FOR CUSTOMIZING USER EXPERIENCE

CROSS REFERENCE TO RELATED APPLICATIONS

This application claims the benefit of U.S. Provisional Patent Application Ser. No. 61/165,769 filed Apr. 1, 2009 and titled "Method for Customizing User Communication Experience", the entire contents thereof being incorporated herein by reference.

BACKGROUND OF THE INVENTION

Advertising is a most important revenue source for various content and service providers of digital media. As the range of data sharing and transmission methods increases, the ability for such content and service providers to generate revenue in ways that do not increase cost or decrease enjoyment of the user is imperative. A user may be frustrated by receiving generic advertisements peddling products or services which are of no interest to the user, and is therefore less likely to use such advertisements for purchasing or navigation. More customized advertising, however, is likely to be viewed more favorably by a user, and thus in turn provide a more effective advertising model.

With the growing popularity of interactive TV, a user is able to interact with the transmitted content using the traditional remote controller and enhance the video viewing experience. This interactivity has the potential to cause the demise of the 30 second commercial spots in broadcasted content in that a user is able to skip over such a commercial if the program is recorded, or at least the user might switch to some other activity for the length of the commercial. Much like the Internet, the on-demand and interactive nature of the IPTV can open up new opportunities with regard to targeted advertisement, perhaps giving rise to alternative advertisement models that target individuals based on their 'intent'. The current 30 second ads are more of a spray gun approach that are expensive and have low yield. For targeted ads, it is important to understand the user's intent during the time of interactivity.

Mobile communication devices have allowed conversations between people in an ever increasing number of ways, including email, texting, SMS and the like. These conversations are not currently subject to advertising, thus causing advertisers to miss out on target audiences, and users to possibly miss out on being informed through advertising channels.

Providing tailored advertising to a user based upon search terms input into a search engine while employing a computer over a computer network such at the World Wide Web is well known to those of ordinary skill in the art. There has also been interest in providing tailored advertising to computer users when working with various computer programs, and performing various user-initiated actions, other than those associated with a search query. In one example, U.S. patent application Ser. No. 11/042,246 "Content-Targeted Advertising for Interactive Computer-Based Applications", to Goodman et al., filed Jan. 25, 2005 describes a method whereby outgoing email, calendar entries, chat messages or gaming participant interactions over a computer network are analyzed to determine various key elements. Thereafter, one or more tailored advertisements may be provided in accordance with the results of this analyzation. While this fundamental analysis may be a simple matter when using a traditional computer and input device, such as a computer keyboard, the inventors of the present invention have determined that unique difficulties may arise when more progressive input devices on varied communication systems are employed.

SUMMARY OF THE INVENTION

In accordance with the present invention, a unique method for service customized, tailored advertising to a user of one or more alternative input devices and communication devices or platforms is provided. Such input and communication devices and platforms may employ one or more data input procedures for aiding in increasing the accuracy of such input, such as the procedures set forth, by way of example, in PCT application Serial No. PCT/GB2007/050338 "Data Entry System and Method of Entering Data", to Sharan et al., filed Jun. 14, 2007, U.S. Provisional Patent Application Ser. No. 61/142,459 "A System for Text Input Using Directional Input Devices and Numeric Keypads", to Sharan et al., filed Jan. 5, 2009, and U.S. patent application Ser. No. 12/500,675 "Method and Apparatus for Text Input" filed Jul. 10, 2009, to Sharan et al., the entire contents of these applications being incorporated herein by reference.

In an exemplary embodiment of the invention, a user relies on a traditional type of remote control to provide input to a television. By utilizing the processes noted above, a standard QWERTY keyboard is preferably displayed on the television display. A user is able to select a sequence of letters, or portions of the keyboard, allowing the processes noted above to determine a desired input word or phrase based on the application the user is interacting with. This data entry may take place in the context of a chat with another viewer, an outgoing email, or a user initiated search session. Once the content of the data entry has been reviewed by the system, the user's intent is determined. In a preferred embodiment a number of advertisements selected in accordance with the context of the data input, as well as perhaps other location, demographic and personal data, may be provided to the user adjacent the virtual keyboard or at other convenient location on the television display. Additionally, this intent can also used to match the user to desirable video content, promotions and offers and appropriate icons will show up along with any suitable advertisements.

In an additional exemplary embodiment of the invention, a user relies on a well known touch screen or other keyboard input device provided on a mobile computing or communication device, such as a cellular telephone, portable computer, or PDA such as an iPhone® or the like. By utilizing the processes noted above, a standard QWERTY keyboard is preferably displayed on the display of the communication device. A user is able to select a sequence of letters, or portions of the keyboard, allowing the processes noted above to determine a desired input word or phrase based upon the application with which the user is interacting. This data entry may take place in the context of a chat with another person, an outgoing email, or a user initiated search session. Once the content of the data entry has been reviewed by the system, the user's intent is determined. In a preferred embodiment a number of advertisements selected in accordance with the context of the data input, as well as perhaps other location, demographic and personal data, may be provided to the user adjacent the virtual keyboard or at other convenient location on the device display. Additionally, this intent can also used to match the user to desirable video content, promotions and offers and appropriate icons will show up along with any suitable advertisements.

In an additional preferred embodiment of the invention, the system may provide the user with an offer to search for various information based upon the user input and other demographic, location or other personal data. Thus, for example, if a user is chatting with a friend about going out for dinner, the user might be provided advertisements to local restaurants, or may be provided with a suggested search to find these local restaurants.

Therefore, in accordance with the invention, a user experience is enhanced as relevant information is provided to a user without additional effort on the part of the user.

BRIEF DESCRIPTION OF THE DRAWINGS

For a more complete understanding of the invention, reference is made to the following description and accompanying drawings, in which.

DETAILED DESCRIPTION OF THE INVENTION

A preferred embodiment of the invention will now be described. While such description makes reference to a particular set of steps or system elements, it is intended that this disclosure not exclude any similar such methods or system elements that might be considered an equivalent. In particular, while many of the examples set forth herein refer to a chat between two or more participants, it is intended that the invention be applicable to any other type of digital communication, including but not limited to conversations employing community rooms or other forums, Twitter, Facebook or any other networking or communication tools. Furthermore, while the primary example describes interaction taking place through the user of a television interface, it is intended that the invention be applicable to any other type of communication device, and including communication between two different types of communication devices.

Figure 2:
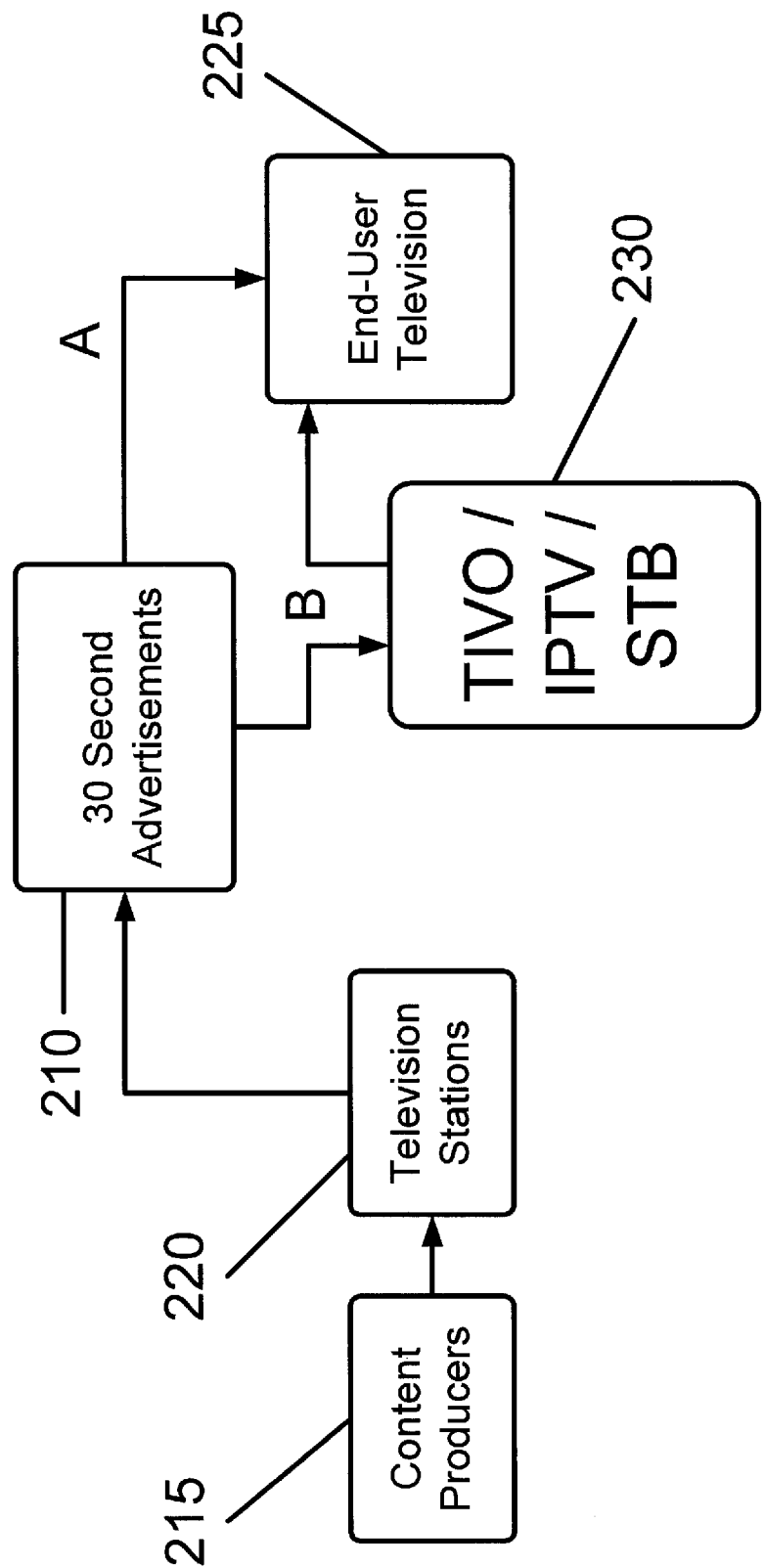
FIG. 2 depicts a relationship between traditional media and advertising.

The inventors of the present invention have determined that advertising and content provision is evolving. As is shown in FIG. 2, a current 30 second advertising model is shown at 200. In accordance with this model, content is provided by a content producer 215 to a television station 220. This content is then inserted into breaks in the television programming viewed by a user in a traditional television viewing scenario 225 along path A. However, with the advent of recording devices, and in particular DVRs, such an advertising model may no longer be appropriate. As is further shown in FIG. 2, television content, including the 30 second advertisements, are recorded to a DVR or other recording device 230 along path B and stored so that the content may be viewed by a user at a time after transmission. In accordance with such delayed viewing, the user is able to skip over the more traditional advertising. Therefore, the value of such advertising is becoming diminished.

Figure 3:
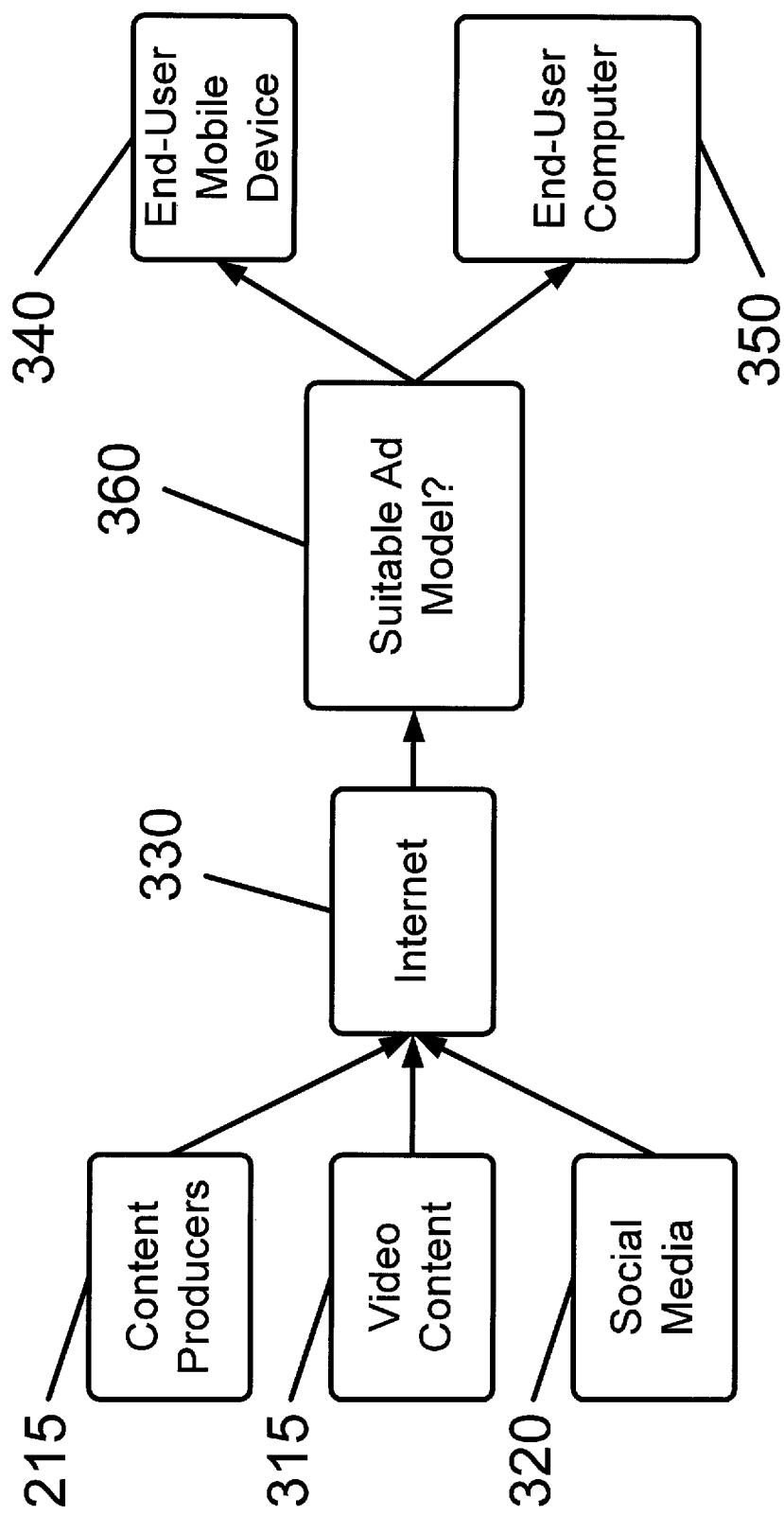
FIG. 3 depicts a relationship between more progressive media and advertising.

In a more progressive information delivery methodology as shown in FIG. 3, much television content is now being posted on the Internet or being provided via alternative delivery means. Thus as is shown in FIG. 3, in addition to traditional content providers 215, additional content, may be provided via various video content sites 315, via social networking sites 320, or via any other known content provision sources. In accordance with this more progressive methodology, all of this content, including advertising and the like is available for access via the Internet 330, or via other data transmission system. Such content is accessed by end users via end user mobile device 340, end user computer 350, or other data access device. Such provision of content in this manner gives the user additional freedom regarding when to view such programming, and whether to skip advertising. Thus, as is shown in FIG. 3, an advertising model 360 in accordance with the present invention is preferably employed in order to overcome the problems if the combination of traditional advertising with the newer delivery and viewing methods, including DVRs and the like, or delivery of content via the Internet.

In each of these scenarios, even if technology were provided to preclude skipping included advertising, and thus requiring the user to watch the advertising, because of a potential long delay between broadcast and viewing, the advertising may no longer be relevant. And indeed, more and more content, including the next generation of video content on television, will likely be provided to the user over the Internet. There may be 24×7 TV channels existing on the Internet and transmitting their content to a TV via an Internet Protocol (IP) connected Set Top Box (STB). This will open up the level of interactivity offered to the user and possibly further change some of the existing advertising models. Therefore, methods for data entry, user interaction, advertising models, and other revenue generation schemes are likely to become far more important as the field of content provision evolves. Thus, in accordance with the invention, a new advertising model is provided that allows for revenue generation on various newer available devices, including DVRs, mobile devices and the like, and allows for timely advertising to be provided to the user.

Figure 1:
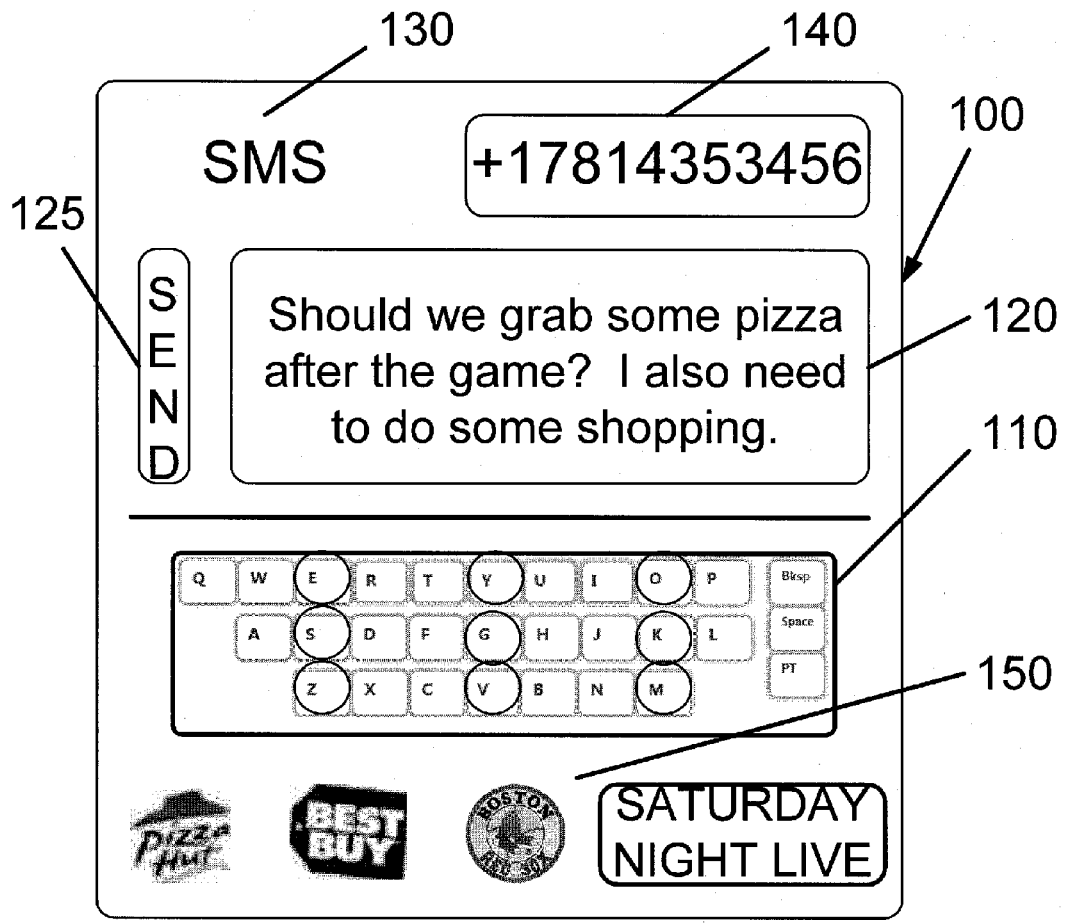
FIG. 1 depicts a display of an advertising scheme in accordance with a preferred embodiment of the invention.

Referring next to FIG. 1, a display 100 is provided, for example, on a television or other content receiving device such as a portable communication device is provided. Display 100 includes a virtual keyboard 110, a message display portion 120 and send button 125, a connection method indicator 130, and a connection recipient indicator 140. The virtual keyboard 110 may be operated in accordance with the method described in U.S. patent application Ser. No. 12/500,675, noted above, or may employ any other text input scheme. Such a keyboard allows a user to input text to be displayed in message display portion 120 and forwarded to one or more recipients via the actuation of send button 125. Connection method indicator displays a current method for communication with one or more recipients noted in recipient indicator 140. Also shown in display 100 is an advertising portion 150 which displays targeted advertising to a user in a method as will be further described below.

After text entry, such as the one noted above, or any other text entry scheme, first, user intent is determined, and then changes to the user experience are made accordingly. Thus, through use of such a virtual keyboard, by way of example, user intent is determined earlier than traditional input methods that must wait for full entry of text, analysis, and finally reaction. With the inventive text input system described above, intent is reviewed and determined on a more continuous basis, thus allowing for adjustments such as advertisement serving, formality levels and the like to change in a near real time environment, thus increasing the likelihood of a user viewing this information, incorporating this information, and thus, for example, advertising revenue being generated. Such real-time interactions in turn encourage the user to provide more information to the system, thus allowing for even more personalization of the input system and viewing device going forward. Once the user intent is determined, including various subjects being discussed between parties, this information may be used to form a basis of the type of advertising that might be helpful to the user. Thus, unlike more traditional systems that provide advertising in response to search terms or the like, in accordance with the invention, advertising can be tailored to a user or group of users when they are interacting in a less obtrusive manner. By providing advertising to users when they are performing virtually any task, the likelihood that the user will interface with such advertising is increased.

The provision of such a virtual keyboard, advertising, search suggestions (as will be described below) and the like provides another way to understand the user's intent. By encouraging the user to interact more (with various applications or search engines), using the inventive text input infrastructure as a measure for user's intent, that intent can be more effectively catered to, and therefore monetized while avoiding the restrictions of the more traditional 30 second advertising spot. It is therefore the employment of such input systems, such as the inventive virtual keyboard, that allow the divining of user intent in a more efficient manner over evolving communication channels, such as interactive television, to further enhance the user experience and increase the likelihood of advertising revenue, two goals that in the past have appeared to be at odds. By providing such an enhanced user experience, advertising support of such new communication channels will be more likely, in turn providing multiple ways for users to receive content.

While a general description of advertisement serving has been described above, a number of additional features of the invention provide the user with a more complete user experience. In a first embodiment of the invention, advertising may be determined individually for each of a plurality of users in communication, or may be determined as a group. Thus, one set of advertisements may be provided to all users in a particular chat if it is determined that such common advertisements would be of interest to the group. Thus, by way of example, if a group were chatting about a vacation, advertisements for remote vacation spots might be applicable to all of the users. However, if the chat were related to vacation spots within driving distance of each user, based on location data, different advertisements may be provided to each user, even though the vacation genre had been determined as a group. Thus, any amount of geographic, demographic, or other user-specific information may be employed to customize advertising, even if the general advertising subject matter has been determined as a group. Thus, as is shown in FIG. 1, when users are chatting about grabbing pizza and doing some shopping, advertising for restaurants and retailers are provided. Such advertising may be based upon other user profile information, or other portions of a chat that may have taken place between the users.

In yet further embodiments of the invention, a designated or recognized relationship between participants taking part in a chat or other communication may be considered, in addition to the information noted above, in determining not only which input word or phrase was intended by a user, but also to influence the type and content of served advertising. By way of example, communications between business colleagues, friends and a spouse or other family member are likely to have different levels of formality, and therefore different word and vocabulary choices and different advertising needs. By designating or determining such relationships, the accuracy of the probabilistic data input models described in the other incorporated applications noted above can be improved, and the relevance of served advertising can be improved as well.

By way of non-limiting example, if one were to observe a particular city on a television program, a chat about that city to a business colleague may generate advertisements related to beneficial business environments in the city, taxes, funding assistance, available and upcoming conventions and hotels and the like. A chat during this same program with a friend may warrant advertisements about baseball games or other activities, spas in the city, restaurants and other leisure activities. Finally, a similar chat with a family member or spouse may result in advertising for more family oriented restaurants, hotels and activities, or perhaps more romantic destinations may be provided. Of course, the method and system of the invention is able to learn, based upon historical communications and other selection information, to provide an even more tailored and specific advertising scheme upon initiation of a communication with a particular party.

These various communications may, therefore, be defined by various levels of formality. Thus, a business communication may be defined as most formal, communication with a friend less so, and communication with a spouse or family member the least formal. When communication with the group, in accordance with a further embodiment of the invention, it is desirable for the word selection and served advertising to be commensurate with the most formal communication scheme that would be appropriate between any of the parties. Thus, if a number of friends were chatting, resulting in a particular type and formality of advertising being served to the group, and then a co-worker of one of the participants were to join the chat, in accordance with the invention, the level of formality of language and content of advertising would rise to the level of co-worker for all participants, to the extent they were receiving common advertising. Of course, if individualized advertising were being served, the co-worker would preferably receive advertising at the co-worker level of formality, while the friends may continue to receive advertising at the friend level of formality.

Many fundamental difficulties arise when using alternate input devices and communication platforms based upon an unsure determination of the intention of the user. While the processes described in the noted applications incorporated above reduce imprecision in word choice to a minimum, there are cases where word determination is still a close probabilistic call. While each user input results in a selected word, many of these input schemes are based upon a probability of being correct, or must otherwise select between two or more possible input determinations. Furthermore, with the progression of acceptable idioms, acronyms, or other coded communications in chats or other communications, keeping 100% up to date with a dictionary of acceptable uses and probabilities thereof may be difficult. Therefore, in accordance with an embodiment of the invention, if a particular level of uncertainty is reached in selection of one particular determined input word or phrase as compared to a next most likely alternative, advertising may be served associated with not only the selected word or phrase, but also the next most likely number of input words or phrases. Thus, if a word is interpreted improperly but for some reason is not corrected by a user, appropriate advertising may still be provided to the user, thus increasing the likelihood of the user navigating in accordance with such advertising.

Alternatively to providing advertising, in each case, including when word or phrase selection may be difficult probabilistically, a user may be provided with a search suggestion. Thus, the user can be asked whether they would like to conduct a search using a number of provided keywords in accordance with a parsing of the communication content, or other determinants as noted above. In this manner, the user is able to avoid advertising when not desired, but can easily avail him or herself of such advertising when they are most likely to navigate in accordance with such advertising.

An additional use of the input device allows a user to navigate a search or a search results page. Thus, word or phrase pattern recognition allows the user to begin to enter a phrase or word similar to that in one of the suggested searches, or in one line of the search results. Once recognized, the display is advanced to that line, and the user can select to run a search in accordance with the designated one of perhaps a number of suggested searches, or can navigate to one particular result in a list of search results.

These are particularly useful features when entering information through an alternative input mechanism, such as a television remote employing an on screen keyboard, as entry is approximate and uses various coding techniques to determine user intent. While such a system allows for easier user interaction, there is some potential ambiguity in the user intent. Thus, in this or any other input system employing an input approximation, such systems including the above noted advertising serving for multiple probable words, suggesting potential searches, and navigating a search page may be extremely useful to a user.

It is further contemplated in accordance with the invention to provide a revenue model in which advertising revenues are shared with a search provider, even when generated in a non-search initiated communication session. Thus, while a traditional pay per click model may be appropriate, suggestive searches or served advertising may result in an increased advertising rate as the likelihood of navigation in accordance with the provided advertising or search results is increased.

Therefore, it is contemplated that the invention is directed to the user of information provided by a user in any type of communication or interaction to provide targeted advertising. Such a feature may be beneficial when users are chatting using a television, mobile devices or the like. Additional user demographic data may be further employed to narrow down from a selection of potentially appropriate advertising. Furthermore, the other members of a communication system may have an impact on the advertising provided to a user.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for customizing a user communication experience, comprising:
   receiving a user communication input,
      wherein the user communication input comprises communication that is conducted between a user and one or more recipients;
   determining a highest formal relationship level existing between the user and the one or more recipients;
   selecting a first advertisement to provide to the user based on: A) information specific to the user and B) the determined highest formal relationship level;
   selecting a second advertisement different from the first advertisement to provide to at least one of the one or more recipients based on: A) information specific to the at least one of the one or more recipients and B) the determined highest formal relationship level; and
   providing the first advertisement to the user and providing the second advertisement different from the first advertisement to the at least one of the one or more recipients.

2. The method of claim 1, wherein the user communication input comprises a chat.

3. The method of claim 1, wherein the user communication input comprises an email.

4. The method of claim 1, wherein the user communication input comprises an instant message.

5. The method of claim 1, wherein selecting the second advertisement is further based on one or more communication input characteristics, and wherein the one or more communication input characteristics comprise an identity of the at least one of the one or more recipients.

6. The method of claim 1, wherein selecting the first advertisement is further based on one or more communication input characteristics, and wherein the one or more communication input characteristics comprise a geographical location of the user.

7. The method of claim 1, wherein selecting the second advertisement is further based on one or more communication input characteristics comprising a geographical locating of the at least one of the one or more recipients.

8. The method of claim 1, wherein the user communication input is provided to a mobile communication device.

9. The method of claim 1, wherein the user communication input is provided to a television or a set top box.

10. The method of claim 1,
    wherein a receiving party is at least one of the one or more recipients,
    wherein a common advertising genre is determined for both the user and the receiving party, and
    wherein selection of the first advertisement and selection of the second advertisement are both further based on the determined advertising genre.

11. The method of claim 1, wherein selecting the first advertisement is further based on one or more communication input characteristics, and wherein the one or more communication input characteristics comprise the identity of the user.

12. The method of claim 1, wherein the first advertisement is provided to at least one other of the one or more recipients, wherein the at least one other of the one or more recipients does not receive the second advertisement.

13. The method of claim 12, wherein selecting the first advertisement or selecting the second advertisement is further based on both a geographical location of the user and a geographical location of the at least one of the one or more recipients.

14. A method for customizing a user communication experience, comprising:
    receiving a user communication input at a mobile communication device,
       wherein the user communication input comprises communication that is conducted between a user and one or more receiving parties;
    determining a highest formal relationship level existing between the user and the one or more receiving parties;
    selecting a first advertisement to provide to the user based on: A) information specific to the user and B) the determined highest formal relationship level;
    selecting a second advertisement different from the first advertisement to provide to at least one of the one or more receiving parties based on: A) information specific to the at least one of the one or more receiving parties and B) the determined highest formal relationship level; and providing the first advertisement to the user and providing the second advertisement different from the first advertisement to the at least one of the one or more receiving parties.

15. The method of claim 14, wherein the user communication input is provided in accordance with a virtual keyboard.

16. The method of claim 14, wherein selecting the first advertisement or selecting the second advertisement is further based on one or more determined communication characteristics comprising one or more of:
   a predefined relationship between the user and the at least one of the one or more receiving parties,
   a geographic location of the user, and
   a geographic location of the at least one of the one or more receiving parties.

17. A system for customizing a user communication experience, comprising:
   a memory and one or more processors configured to:
      receive a user communication input,
         wherein the user communication input comprises communication that is conducted between a user and one or more receiving parties;
      determine a highest formal relationship level existing between the user and the one or more receiving parties;
      select a first advertisement to provide to the user based on: A) information specific to the user and B) the determined highest formal relationship level;
      select a second advertisement different from the first advertisement to provide to at least one of the one or more receiving parties based on: A) information specific to the at least one of the one or more receiving parties and B) the determined highest formal relationship level; and
         provide the first advertisement the user and provide the second advertisement different from the first advertisement to the at least one of the one or more receiving parties.

18. The system of claim 17,
   wherein the user communication input is received by the one or more receiving parties at a television or set top box,
   wherein the user communication input is for a text-based chat, and
   wherein the second advertisement is displayed to the at least one of the one or more receiving parties on a television display associated with the television or set top box.

19. The system of claim 17,
   wherein the user communication input is received by one or more the receiving parties at a mobile communication device,
   wherein the user communication input is for a text-based chat, and
   wherein the second advertisement is displayed to the at least one of the one or more receiving parties on the mobile communication device.

20. The system of claim 17, wherein the first advertisement or the second advertisement is customized based on at least two of:
   demographic data,
   geographic user location,
   historical communication of a text-based chat, and
   uncertainty that the user communication input has been interpreted properly.

21. The system of claim 17, wherein the memory and one or more processors are further configured to:
   provide suggested search keywords based at least in part on a probability that a particular word or phrase was intended by the user communication input,
   wherein the first advertisement is provided to the user based on a most likely word or phrase, and a third advertisement is provided the user based on a next most likely word or phrase.

22. The system of claim 17 wherein the first advertisement is customized based on an uncertainty that the user communication input has been interpreted properly.

23. A non-transitory computer readable medium storing executable instructions that, when executed by a computing system, cause the computing system to perform operations for customizing a user communication experience, the operations comprising:
   receiving a user communication input,
      wherein the user communication input comprises communication that is conducted between a user and one or more receiving parties;
   determining a highest formal relationship level existing between the user and the one or more receiving parties;
   selecting a first advertisement to provide to the user based on: A) information specific to the user and B) the determined highest formal relationship level;
   selecting a second advertisement different from the first advertisement to provide to at least one of one or more receiving parties based on: A) information specific to the at least one of the one or more receiving parties and B) the determined highest formal relationship level; and
   providing the first advertisement to the user and providing the second advertisement different from the first advertisement to the at least one of the one or more receiving parties.

24. The non-transitory computer readable medium of claim 23,
   wherein the user communication input is received by the at least one of one or more receiving parties at a television or set top box,
   wherein the user communication input is for a text-based chat, and
   wherein the second advertisement is displayed to the at least one of the one or more receiving parties on a television display associated with the television or set top box.

25. The non-transitory computer readable medium of claim 23,
   wherein the user communication input is received by the receiving party at a mobile communication device,
   wherein the user communication input is for a text-based chat, and
   wherein the second advertisement is displayed to the at least one of the one or more receiving parties on the mobile communication device.

26. The non-transitory computer readable medium of claim 23, wherein the first advertisement or the second advertisement is customized based on at least two of:
   demographic data,
   geographic user location,
   historical communication of a text-based chat, and
   uncertainty that the user communication input has been interpreted properly.

27. The non-transitory computer readable medium of claim 23, wherein the operations further comprise providing suggested search keywords based at least in part on a probability that a particular word or phrase was intended by the user communication input.

* * * * *